United States Patent
Lachnitt et al.

(10) Patent No.: US 9,350,839 B2
(45) Date of Patent: May 24, 2016

(54) MOBILE TELEPHONE INTEGRATION SYSTEM

(71) Applicant: Peiker Acustic GmbH & Co. KG, Friedrichsdorf (DE)

(72) Inventors: Jens Lachnitt, Alsfeld (DE); Oliver Rast, Wielenbach (DE); Torsten Hartmann, Unterschleißheim (DE); Sinisa Trifunovic, München (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 14/542,922

(22) Filed: Nov. 17, 2014

(65) Prior Publication Data

US 2015/0141087 A1     May 21, 2015

(30) Foreign Application Priority Data

Nov. 18, 2013   (DE) .......................... 10 2013 019 175

(51) Int. Cl.
  *H04M 1/00*   (2006.01)
  *H04B 1/38*   (2015.01)
  *H04M 1/04*   (2006.01)

(52) U.S. Cl.
  CPC ....................................... *H04M 1/04* (2013.01)

(58) Field of Classification Search
  CPC .. H04M 1/21; H04M 1/6075; H04M 1/72527
  USPC ................ 455/90.3, 556.1, 557, 575.1, 575.9
  See application file for complete search history.

(56) References Cited

U.S. PATENT DOCUMENTS

| | | | | |
|---|---|---|---|---|
| 5,189,358 A | * | 2/1993 | Tomura | B60R 11/0241 455/575.9 |
| 5,493,703 A | * | 2/1996 | Yamashita | H04B 1/3877 455/557 |
| 5,896,564 A | * | 4/1999 | Akama | B60R 11/0241 455/575.9 |
| 6,304,764 B1 | * | 10/2001 | Pan | H04M 1/6083 455/557 |
| 6,377,825 B1 | * | 4/2002 | Kennedy | B60R 11/0241 455/556.1 |
| 2009/0273891 A1 | | 11/2009 | Peiker | |
| 2010/0323657 A1 | * | 12/2010 | Barnard | H04W 4/02 455/557 |

FOREIGN PATENT DOCUMENTS

EP     2 125 434 B1     8/2010

* cited by examiner

*Primary Examiner* — Quochien B Vuong
(74) *Attorney, Agent, or Firm* — Burr & Brown, PLLC

(57) ABSTRACT

A mobile telephone integration system including an adapter having a main body and a clip which, from an edge of the main body, projects, in a clamping position under prestress in the direction of the bearing surface, over the bearing surface such that a mobile telephone can be pushed into a holding position between a free end of the clip and the bearing surface. A noise-generating means generates a warning noise when the clip is deflected in the opening direction into an overload position by virtue of a rotation process in which the clip is moved out of its release position owing to an increased action of force in the opening direction. The clip pivots back into the release position again by virtue of a return rotation process in which the clip is moved from its overload position owing to an action of force in the closing direction.

7 Claims, 4 Drawing Sheets

MOBILE TELEPHONE INTEGRATION SYSTEM

This application claims the benefit under 35 USC §119(a)-(d) of German Application No. 10 2013 019 175.0 filed Nov. 18, 2013, the entirety of which is incorporated herein by reference.

BACKGROUND OF THE INVENTION

1. Field of the Invention

The invention relates to a mobile telephone integration system.

2. Description of Related Art

EP 2 125 434 B1 discloses a mobile telephone integration system which comprises an adapter and a holding apparatus, the adapter comprising a bearing surface, it being possible for a mobile telephone to be placed on the bearing surface, the holding apparatus being fastened to a vehicle, the adapter being detachably held on the holding apparatus and comprising a main body, the adapter comprising at least one interface to the mobile telephone. Adapters of this kind, which are in the form of receiving apparatus, are specially adapted to different mobile telephones in the document.

SUMMARY OF THE INVENTION

The invention is based on the object of developing a mobile telephone integration system which is tolerant in respect of incorrect operation and indicates incorrect operation to the user.

The essence of the invention is a noise-generating means by which a warning noise is generated in the event of incorrect operation, specifically the rotation of the clip into an overload position or improper use position, so that a user is warned before the incorrect operation is continued.

Furthermore, provision is also made for a further noise to be generated when the clip is rotated back into the release position which is intended to be an end position during normal operation, the further noise signaling to the user that the return rotation movement has been successful. Accordingly, the further noise is also called an acknowledgement noise.

BRIEF DESCRIPTION OF THE DRAWINGS

Further details of the invention will be described with reference to schematically illustrated exemplary embodiments in the drawing.

DETAILED DESCRIPTION OF THE INVENTION

Figure 1:
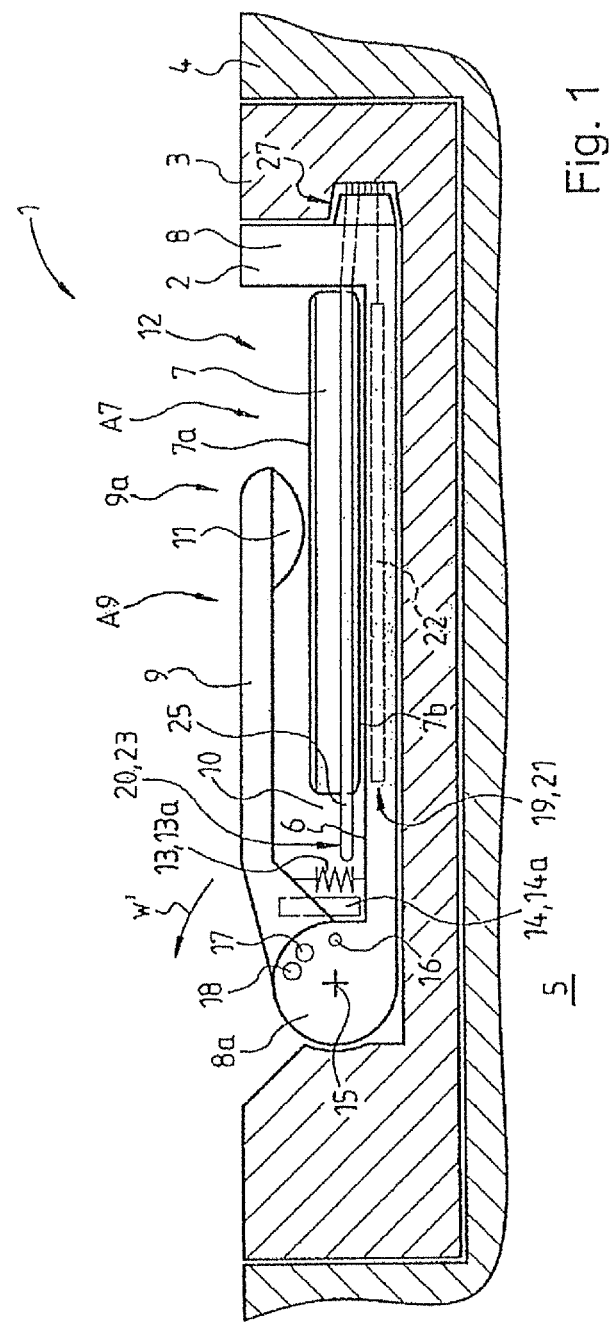
FIG. 1 shows a partially sectioned side view of a first variant embodiment of a mobile telephone integration system according to the invention in which a clip is in a clamping position.
Figure 2:
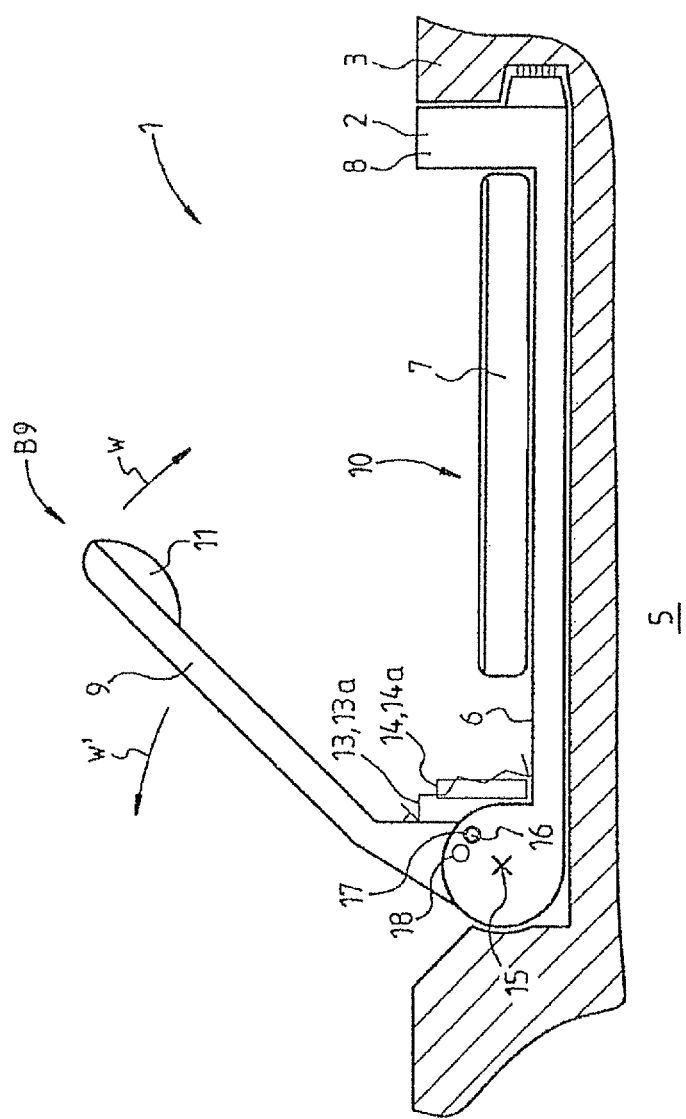
FIG. 2 shows a second side view of the first variant embodiment, the clip being in a release position.
Figure 3:
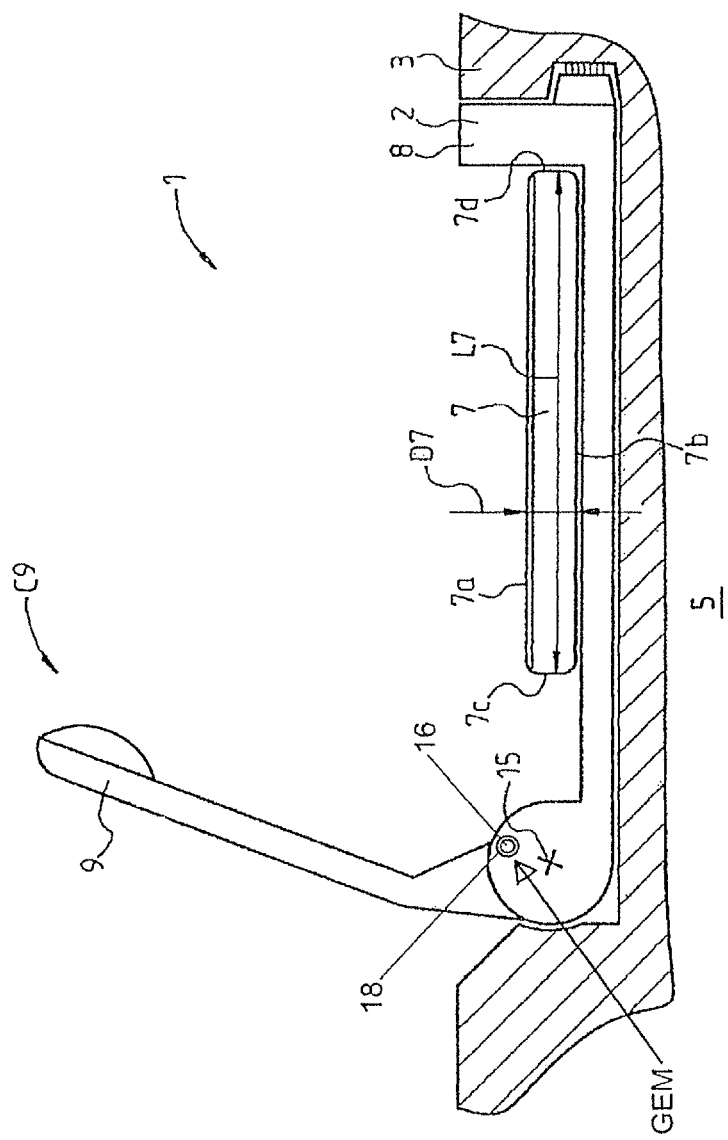
FIG. 3 shows a third side view of the first variant embodiment, the clip being in an overload position.
Figure 4:
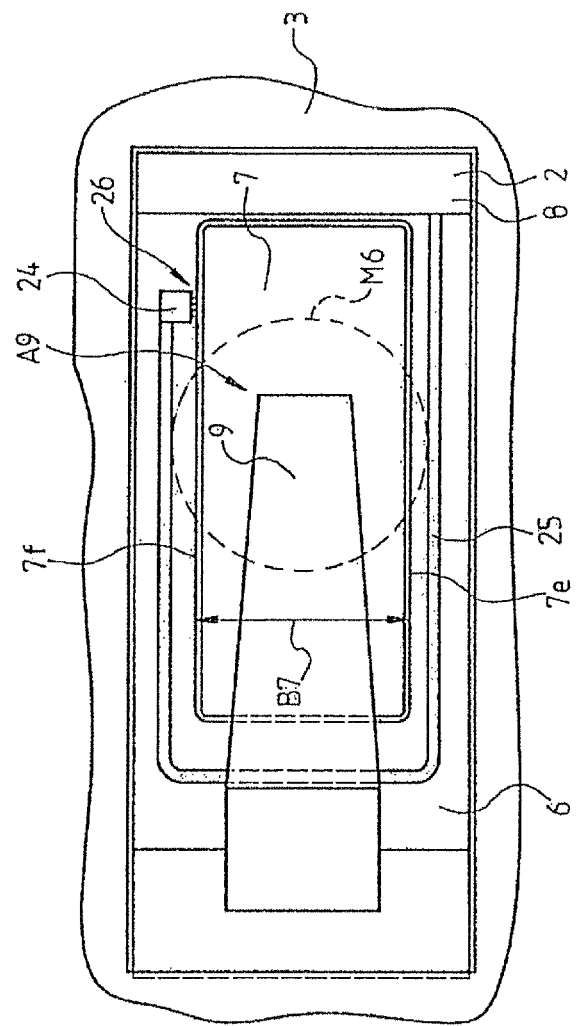
FIG. 4 shows a plan view of the first variant embodiment, the clip being in the clamping position.

FIG. 1 shows a partially sectioned side view of a first variant embodiment of a mobile telephone integration system 1 according to the invention. The mobile telephone integration system 1 comprises an adapter 2 and a holding apparatus 3, wherein the holding apparatus 3 is accommodated in a console 4 of a vehicle 5. The console 4 and the holder apparatus 3 are illustrated in section in order to be able to show the adapter 2 in side view. The adapter 2 comprises a bearing surface 6 on which a mobile telephone 7 is placed. The mobile telephone 7 faces upward by way of a display 7a and faces the bearing surface 6 by way of a rear face 7b which is opposite the display 7a. The adapter 2 is detachably fixed to the holding apparatus 3 and can be separated from the holding apparatus. The adapter 2 comprises a main body 8 and a clip 9 which, from an edge 8a of the main body 8, projects, in a clamping position A9, shown in FIG. 1, under prestress in the direction of the bearing surface 6, over the bearing surface 6 by way of an abutment means 11 into a receiving space 10 for the mobile telephone 7. In this case, the mobile telephone 7 can be pushed through an access point 12, into the receiving space 10 between a free end 9a of the clip 9 and the bearing surface 6, into a shown holding position A7. In this holding position A7 in which the mobile telephone 7 bears on the bearing surface 6 of the adapter 2 by way of its rear face 7b, the mobile telephone 7 is fixed between the clip 9 and the bearing surface 6 by the clip 9 which presses onto the display 7a of the mobile telephone 7 by way of the abutment means 11. This clip 9 holds the mobile telephone 7 in a captive manner in the adapter 2 in the shown holding position A7 even when the vehicle 5 is being driven. The clip 9 is pulled into the clamping position A9 shown in FIG. 1 by a clamping means 13 which is in the form of a spring 13a. In parallel with the clamping means 13, a damping means 14 which is in the form of a compressible foam block 14a also acts on the clip 9. The clip 9 is connected in an articulated manner to the main body 8 such that it can pivot about a rotation axis 15 and comprises a latching head 16 which, in the event of rotation of the clip 9 out of the shown clamping position A9 against the force of the clamping means 13 in a rotation direction w', interacts with latching recesses 17 or 18, which are formed on the main body 8, when a release position B9 shown in FIG. 2 or an overload position C9 shown in FIG. 3 is reached. The schematically illustrated components 13, 14 and 16 to 18 are also shown in FIG. 2; FIG. 3 shows only components 16 and 18 for reasons of clarity. The console of the vehicle has also been omitted from FIGS. 2 and 3 for reasons of clarity. In contrast to FIGS. 2 and 3, FIG. 1 also shows a first interface 19, 20 in two different embodiments which can be implemented in an alternative or cumulative manner in the mobile telephone integration system 1 according to the invention. In this case, the first variant embodiment of the first interface 19 is designed as a wireless charging interface 21. This charging interface 21 comprises an inductive charging unit 22 which is incorporated in the adapter 2, a suitable mobile telephone having a receiver coil, not illustrated, for the inductive charging unit. In this case, the second variant embodiment of the first interface 20 is designed as a wired charging interface 23. The wired charging interface comprises—as also shown in the plan view of FIG. 1 shown in FIG. 4—a plug 24 and a charging cable 25, the plug 24 being matched to a plug socket 26, not illustrated in any detail, of the mobile telephone 7. Power is supplied by the vehicle 5 by means of the holding apparatus 3 which is connected to the adapter 2 by means of an electrical plug connection 27.

FIG. 2 shows—as already mentioned—a second side view of the first variant embodiment of the mobile telephone integration system 1, the clip 9 being in the release position B9 in which the mobile telephone 7 can be removed without problems from the receiving space 10 which is situated above the bearing surface 6 and conversely can also be inserted into the receiving space 10 without problems. FIG. 2 shows how the latching head 16 is received in the latching recess 17 in the release position B9 of the clip 9. Starting from the release position B9, this clip 9 can then be pivoted back into the clamping position A9, shown in FIG. 1, about its rotation axis 15, the clip 9, after manually overcoming the holding force which the clip 9 is subjected to by means of the latching head 16 on the main body 8, being pivoted about the rotation axis 15 in rotation direction w by the spring 13a. In order to prevent the clip 9 from thudding onto the display 7a of the mobile telephone 7 by way of its abutment means 11, the rotation speed of the clip 9 is reduced by the damping means 14 before the abutment means 11 of the clip 9 meets the display 7a since the clamping means 13 additionally has to apply a force for overcoming the counterforce of the damping means 14.

FIG. 3 shows—as already mentioned—a third side view of the first variant embodiment of the mobile telephone integration system 1, the clip 9 being in the overload position C9 into which the clip 9 is moved when it is accidentally moved further in the rotation direction w' from the release position B9. The overload position C9 also serves as a cleaning and servicing position. In order to signal to the user that the overload position C9, which is also called the improper use position or incorrect operation position, is a position which should not be used in everyday application of the mobile telephone integration system, the latching head 16 and the latching recess 18, as interacting components, are in the form of noise-generating means GEM which mechanically generate an audible warning noise when they enter the overload position C9. This warning noise signals to the user that the overload position C9 is a position which is not intended for everyday operation. A noise which is also called an acknowledgement noise is also generated by the noise-generating means GEM when the overload position is left in the event of a return rotation process out of the overload position C9 into the release position B9, since the noise informs the user that the special overload position C9 has now been successfully left again. The mobile telephone 7 has a thickness D7 which is measured between the display 7a and the rear face 7b, and a length L7 which is measured between a top side wall 7c and a bottom side wall 7d.

It goes without saying that the invention also provides for the use of a noise-generating means which is not formed by the latching head 16 and the latching recess 18, but rather is designed as a further component.

In particular, provision is also made for the noise-generating means to be in the form of an electrical or electronic noise-generating means which comprises a sensor which detects the overload position.

A further variant makes provision for a first and a second noise-generating means to be used in order to generate the warning noise and, respectively, in order to generate the acknowledgement noise.

According to one variant embodiment, provision is also made for the adapter 2 to be fastened to the console without the holder apparatus 3.

A further variant embodiment makes provision for the processes of latching into and, respectively, unlatching from the overload position to be performed with a latching force which is at least twice a latching force with which the clip latches into and, respectively, unlatches from the release position, so that the user is also informed of the difference between the two positions in a haptic manner, that is to say by gripping the clip.

LIST OF REFERENCE SYMBOLS

1 Mobile telephone integration system
2 Adapter
3 Holding apparatus
4 Console of 5
5 Vehicle
6 Bearing surface of 2
7 Mobile telephone
7a Display of 7
7b Rear face of 7
7c Top side wall of 7
7d Bottom side wall of 7
7e Left-hand side wall of 7
7f Right-hand side wall of 7
8 Main body
8a Edge of 8
9 Clip
9a Free end of 9
10 Receiving space of 2
11 Abutment means of 9
12 Access point to 10
13 Clamping means
13a Spring
14 Damping means
14a Foam block
15 Rotation axis of 9 on 8
16 Latching head of 9
17, 18 Latching recess for 16
19, 20 First interface
21 Wireless charging interface
22 Inductive charging unit
23 Wired charging interface
24 Plug on 25
25 Charging cable
26 Plug socket on 7
27 Electrical plug connection between 2 and 3
A7 Holding position of 7
A9 Clamping position of 9
B9 Release position of 9
C9 Overload position of 9
GEM Noise-generating means
L7 Length of 7
M6 Central region of 6
w, w' Rotation direction of 9 around 15
Z107 Intermediate position of 107
B7 Width of 7
L7 Length of 7
D7 Thickness of 7

The invention claimed is:
1. A mobile telephone integration system comprising:
a holding apparatus, the holding apparatus being fastened to a vehicle, and
an adapter, the adapter being detachably held on the holding apparatus, the adapter comprising:
a bearing surface, it being possible for a mobile telephone to be placed on the bearing surface,
a main body, and
a clip which, from an edge of the main body, projects, in a clamping position under prestress in the direction of the bearing surface, over the bearing surface in such a way that a mobile telephone can be pushed into a holding position between a free end of the clip and the bearing surface,
the mobile telephone being fixed in the holding position between the clip and the bearing surface by the clip which presses onto the mobile telephone in such a way that said mobile telephone is held in the holding position even when the vehicle is being driven,
the clip being one of arranged in a rotationally fixed manner on the main body and the prestress of the clip being generated by elastic deformation of the clip, and the clip being arranged in a pivotable manner about a rotation axis on the main body and the adapter further comprising a clamping means which is arranged between the main body of the adapter and the clip and generates the prestress, a noise-generating means generating a warning noise when the clip is deflected in the opening direction into an overload position by virtue of a rotation process in which the clip is moved out of its release position owing to an increased action of force in the opening direction, and the clip being pivoted back into the release position again by virtue of a return rotation process in which the clip is moved from its overload position owing to an action of force in the closing direction.

2. The mobile telephone integration system as claimed in claim 1, wherein one of the noise-generating means and a further noise-generating means generates an acknowledgement noise when the clip is turned back, in the case of which the clip is moved from its overload position owing to an action of force in the closing direction.

3. The mobile telephone integration system as claimed in claim 1, wherein the clip is at an angle of from 25° to 50° in relation to the bearing surface in the release position.

4. The mobile telephone integration system as claimed in claim 3, wherein the clip is at an angle of from 25° to 40° in relation to the bearing surface in the release position.

5. The mobile telephone integration system as claimed in claim 1, wherein the clip is at an angle of from −10° to +10° in relation to the bearing surface in the clamping position.

6. The mobile telephone integration system as claimed in claim 1, wherein the clamp is at an angle of more than 40° in relation to the bearing surface in the overload position.

7. The mobile telephone integration system as claimed in claim 1, wherein a latching force, with which the clip engages into and, respectively, out of the overload position, is at least twice as large as a latching force with which the clip is latched into and, respectively, out of the release position.

* * * * *